US012610440B2

(12) United States Patent
Archer et al.

(10) Patent No.: US 12,610,440 B2
(45) Date of Patent: Apr. 21, 2026

(54) SYSTEM AND METHOD FOR DYNAMIC CONTROL OF 2-STAGE LIGHT DRIVER

(71) Applicant: ERP POWER, LLC, Westlake Village, CA (US)

(72) Inventors: Michael Archer, Moorpark, CA (US); Louis Chen, Simi Valley, CA (US); James H. Mohan, Valencia, CA (US)

(73) Assignee: ERP POWER, LLC, Westlake Village, CA (US)

( * ) Notice: Subject to any disclaimer, the term of this patent is extended or adjusted under 35 U.S.C. 154(b) by 59 days.

(21) Appl. No.: 18/438,291

(22) Filed: Feb. 9, 2024

(65) Prior Publication Data

US 2024/0276612 A1 Aug. 15, 2024

Related U.S. Application Data

(60) Provisional application No. 63/492,324, filed on Mar. 27, 2023, provisional application No. 63/484,106, filed on Feb. 9, 2023.

(51) Int. Cl.

*H05B 45/3725* (2020.01)
*H05B 45/14* (2020.01)
*H05B 45/36* (2020.01)
*H05B 45/59* (2022.01)

(52) U.S. Cl.

CPC ......... *H05B 45/3725* (2020.01); *H05B 45/14* (2020.01); *H05B 45/36* (2020.01); *H05B 45/59* (2022.01)

(58) Field of Classification Search

CPC .... H05B 45/3725; H05B 45/14; H05B 45/36; H05B 45/59; H05B 45/355

See application file for complete search history.

(56) References Cited

U.S. PATENT DOCUMENTS

| | | | | |
|---|---|---|---|---|
| 6,175,195 B1 * | 1/2001 | Janczak | ............... | H05B 41/295 315/307 |
| 8,378,589 B2 | 2/2013 | Kuo et al. | | |
| 12,177,310 B2 | 12/2024 | Huang | | |
| 2010/0201335 A1 * | 8/2010 | Li | ..................... | H02M 3/33507 323/284 |
| 2014/0125252 A1 | 5/2014 | Wu | | |

FOREIGN PATENT DOCUMENTS

| | | | | |
|---|---|---|---|---|
| CN | 101754530 B * | 4/2011 | ......... | H05B 45/3725 |
| WO | WO-2020028398 A1 * | 2/2020 | ............. | H05B 45/39 |
| WO | WO 2022/041879 A1 | 3/2022 | | |
| WO | WO-2022041873 A1 * | 3/2022 | ........... | H05B 45/385 |

* cited by examiner

*Primary Examiner* — Abdullah A Riyami
*Assistant Examiner* — Syed M Kaiser
(74) *Attorney, Agent, or Firm* — Womble Bond Dickinson (US) LLP

(57) ABSTRACT

A light driver includes a converter configured to generate a drive signal for driving an output load based on a rectified input signal; a regulator coupled between the converter and the output load, and configured to generate a regulated signal based on the drive signal; a secondary controller configured to detect a voltage of the regulator, to generate a first feedback signal to dynamically control a DC-level of the drive signal based on the voltage of the regulator, and to generate a second feedback signal for controlling a DC-level of the regulated signal.

20 Claims, 4 Drawing Sheets

SYSTEM AND METHOD FOR DYNAMIC CONTROL OF 2-STAGE LIGHT DRIVER

CROSS-REFERENCE TO RELATED APPLICATION(S)

This application claims priority to, and the benefit of, U.S. Provisional Application No. 63/484,106 ("LIGHT DRIVER HAVING A DYNAMICALLY CONTROLLED BUCK CONVERTER INPUT VOLTAGE"), filed on Feb. 9, 2023, and U.S. Provisional Application No. 63/492,324 ("SYSTEM AND METHOD FOR DYNAMIC CONTROL OF 2-STAGE LIGHT DRIVER"), filed on Mar. 27, 2023, the entire contents of which are incorporated herein by reference.

The present application is also related to U.S. patent application Ser. No. 18,438,205 ("SYSTEM AND METHOD FOR DYNAMIC CONTROL OF 2-STAGE LIGHT DRIVER") filed on Feb. 9, 2024, which claims priority to and the benefit of U.S. Provisional Application No. 63/484,106 ("LIGHT DRIVER HAVING A DYNAMICALLY CONTROLLED BUCK CONVERTER INPUT VOLTAGE"), filed on Feb. 9, 2023, and U.S. Provisional Application No. 63/492,324 ("SYSTEM AND METHOD FOR DYNAMIC CONTROL OF 2-STAGE LIGHT DRIVER"), filed on Mar. 27, 2023, the entire contents of which are incorporated herein by reference.

FIELD

Aspects of the present invention are related to light drivers and methods of operating the same.

BACKGROUND

A light emitting diode (LED) is an electronic device that converts electrical energy (commonly in the form of electrical current) into light. The light intensity of an LED is primarily based on the magnitude of the driving current. Given that an LED luminosity is very sensitive to drive current changes, in order to obtain a stable luminous output without flicker, it is desirable to drive LEDs by a constant-current source.

Generally, lighting sources are powered by an input AC voltage of 110 VAC or 220 VAC at 50 Hz or 60 Hz line frequency. The input AC voltage is rectified via a rectifier and converted to a desired output voltage level that will be utilized by the LED. As any input power ripple may induce an output voltage ripple and output current ripple, a feedback loop that measures the output of the converter may be used to implement ripple control.

The above information disclosed in this Background section is only for enhancement of understanding of the invention, and therefore it may contain information that does not form the prior art that is already known to a person of ordinary skill in the art.

SUMMARY

Aspects of embodiments of the present disclosure are directed to a lighting system (e.g., a two-stage light driver) which utilizes a regulator with an independent feedback control loop that is separate from that of the DC-DC converter. As such, the lighting system can further reduce ripple at the output and reduce or eliminate instances of flicker and shimmer at the output.

According to some embodiments, there is provided a light driver including: a converter configured to generate a drive signal for driving an output load based on a rectified input signal; a regulator coupled between the converter and the output load, and configured to generate a regulated signal based on the drive signal; a secondary controller configured to detect a voltage of the regulator, to generate a first feedback signal to dynamically control a DC-level of the drive signal based on the voltage of the regulator, and to generate a second feedback signal for controlling a DC-level of the regulated signal.

In some embodiments, the regulated signal has a lower ripple than the drive signal.

In some embodiments, the voltage of the regulator is a voltage drop across the regulator.

In some embodiments, the light driver further includes: a current sensor coupled to the secondary controller and configured to measure an output current of the regulator; and the secondary controller is configured to generate the second feedback signal based on the output current.

In some embodiments, the current sensor includes: a sense resistor electrically coupled between an output terminal of the regulator and the output load; a current sense circuit coupled to the sense resistor and configured to measure an output current of the regulator via the sense resistor, to generate a sense signal corresponding to the measured output current, and to transmit the sense signal to the secondary controller.

In some embodiments, the secondary controller is configured to generate the second feedback signal based on a dimmer setting.

In some embodiments, the secondary controller is coupled to a dimmer and is configured to determine the dimmer setting based on a signal associated with the dimmer.

In some embodiments, the regulator is configured to generate the regulated signal based on the second feedback signal.

In some embodiments, the drive signal is an output current or an output voltage of the converter, the converter is a DC-DC converter, and the regulator is a step-down converter.

In some embodiments, the converter has a primary side and a secondary side electrically isolated from, and inductively coupled to, the primary side, and the secondary controller and the regulator are electrically isolated from the primary side of the converter.

In some embodiments, the light driver further includes: a primary controller coupled to a primary side of the converter and configured to regulate a DC-level current or a DC-level voltage of the drive signal based on the first feedback signal, and the secondary controller is configured to provide the first feedback signal to the primary controller via an optocoupler.

In some embodiments, the output load includes one or more light emitting diodes (LEDs).

In some embodiments, the light driver further includes: a rectifier configured to generate the rectified input signal based on an input AC signal.

According to some embodiments, there is provided a lighting system including: a rectifier configured to generate a rectified input signal based on an input AC signal; a converter configured to a drive signal for driving an output load based on the rectified input signal, the output load including one or more light emitting diodes (LEDs); a regulator coupled between the converter and the output load, and configured to generate a regulated signal based on the drive signal; a secondary controller configured to detect a voltage of the regulator, to generate a first feedback signal to dynamically control a DC-level of the drive signal based on the voltage of the regulator, and to generate a second feedback signal for controlling a DC-level of the regulated signal.

In some embodiments, the regulated signal has a lower ripple than the drive signal, and the voltage of the regulator is a voltage drop across the regulator.

In some embodiments, the lighting system further includes: a current sensor coupled to the secondary controller and configured to measure an output current of the regulator, and the secondary controller is configured to generate the second feedback signal based on the output current.

In some embodiments, the secondary controller is configured to generate the second feedback signal based on a dimmer setting, and the regulator is configured to generate the regulated signal based on the second feedback signal.

In some embodiments, the secondary controller is coupled to a dimmer and is configured to determine the dimmer setting based on a signal associated with the dimmer.

In some embodiments, the drive signal is an output current or an output voltage of the converter, the converter is a DC-DC converter, the regulator is a step-down converter, the converter has a primary side and a secondary side electrically isolated from, and inductively coupled to, the primary side, and the secondary controller and the regulator are electrically isolated from the primary side of the converter.

In some embodiments, the lighting system further includes: a primary controller coupled to the a primary side of the converter and configured to regulate a DC-level current or a DC-level voltage of the drive signal based on the first feedback signal; the secondary controller is configured to provide the first feedback signal to the primary controller via an optocoupler.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of a lighting system (e.g., light driver) with a two-stage converter design and individualized feedback, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of embodiments of the present disclosure are directed to a light driver, which utilizes a regulator with an independent feedback control loop to reduce the ripple at the output of the converter of the light driver, which reduces or eliminates instances of flicker and shimmer at the output.

Figure 1:
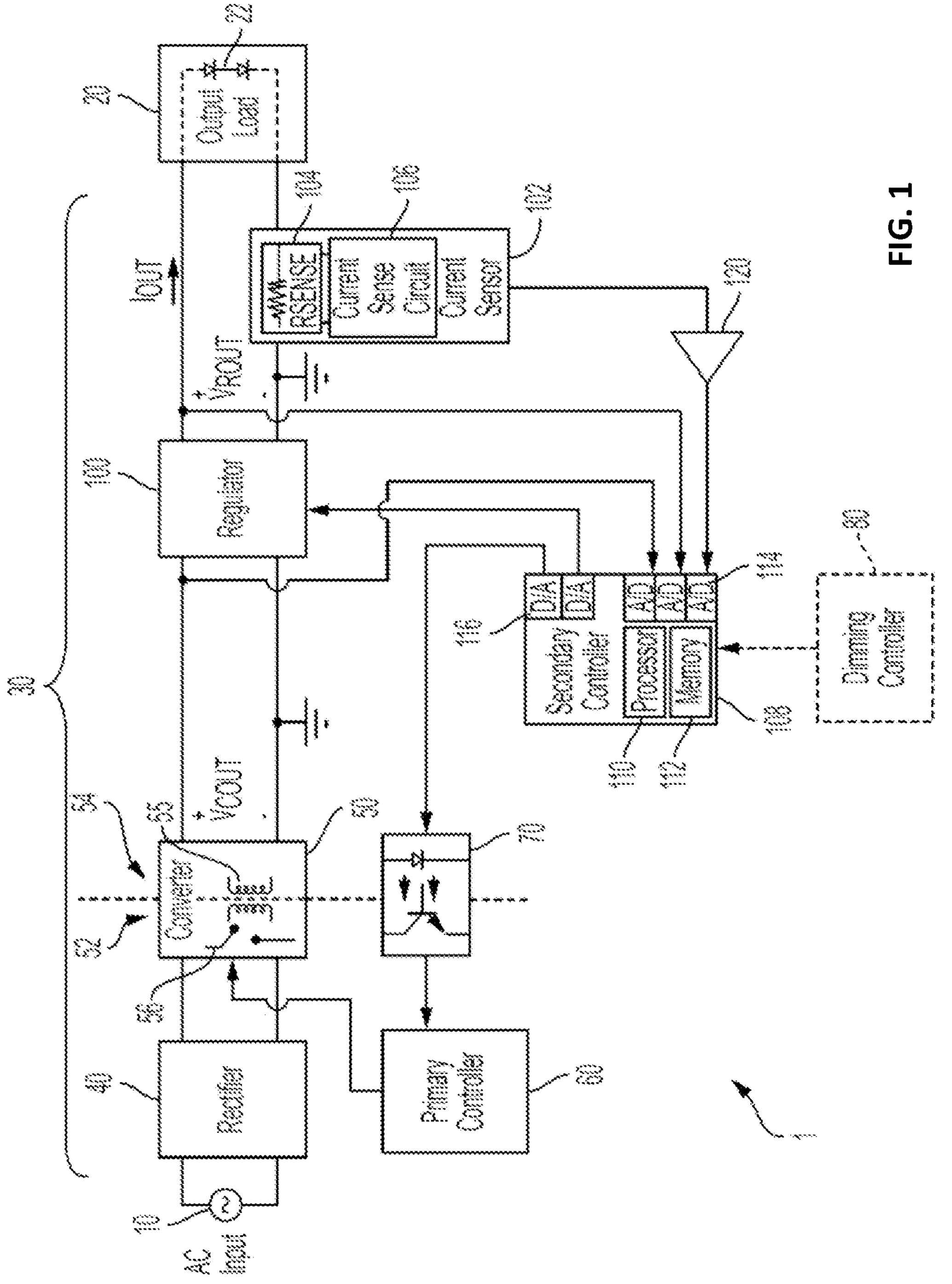
FIG. 1 illustrates a lighting system including a two-stage light driver with improved feedback control, according to some embodiments of the present disclosure.

FIG. 1 illustrates a lighting system including a two-stage light driver with improved feedback control, according to some embodiments of the present disclosure.

According to some embodiments, the lighting system 1 includes an input source 10, an output load 20, and a light driver 30 (e.g., a two-stage light driver) 30 for driving the output load 20 based on the input source 10.

According to some embodiments, the input source 10 may include an alternating current (AC) power source that may operate at a voltage of 100 VAC, a 120 VAC, a 240 VAC, or 277 VAC, for example. The input source 10 may also include a dimmer electrically powered by said AC power sources. The dimmer may modify (e.g., cut/chop a portion of) the input AC signal according to a dimmer level, and may thus variably reduce the electrical power delivered to the output load 20. In some examples, the dimmer may be a TRIAC or ELV dimmer, and may chop the front end or leading edge of the AC input signal. According to some embodiments, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like. The output load 20 may include a light source 22, which may include one or more light-emitting-diodes (LEDs) or an arc or gas discharge lamp with electronic ballasts, such as high intensity discharge (HID) or fluorescent lights. The output load 20 may also include one or more channel controllers to control the CCT color output of the light source 22.

According to some embodiments, the light driver 30 includes a rectifier 40, a converter 50, a primary controller 60, a regulator 100, a current sensor 102, and a secondary controller 108.

The rectifier 40 may provide a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The converter 50 (e.g., the DC-DC converter) converts the rectified AC signal generated by the rectifier 40 into a drive signal for powering and controlling the brightness of the output load 20. The drive signal may depend on the type of the one or more LEDs of the light source 22. For example, when the one or more LEDs of the light source 22 are constant current LEDs, the drive signal may be a variable voltage signal, and when the output load 20 utilizes constant voltage, the drive signal may be a variable current signal. In some embodiments, the converter 50 includes a boost converter for maintaining (or attempting to maintain) a constant DC bus voltage on its output while drawing a current that is in phase with and at the same frequency as the line voltage (by virtue of the primary controller 60). Another switched-mode converter (e.g., a transformer) inside the converter 50 produces the desired output voltage from the DC bus. The converter 50 has a primary side 52 and a secondary side 54 that is electrically isolated from, and inductively coupled to, the primary side 52.

In some embodiments, the primary controller (e.g., a power factor correction (PFC) controller) 60 may be configured to improve (e.g., increase) the power factor of the load on the input source 10. In so doing, the primary controller 60 may drive the main switch 56 within the converter 50, which determines the DC output level of the converter 50. The primary controller 60 may be external to the converter 50, as shown in FIG. 1, or may be internal to and integrated with the converter 50.

The converter 50 may not be able to produce a perfect DC signal at its output and ripples may be present in the output drive signal. For example, there may be an inherent sine wave ripple at the drive signal, which originates from the line input voltage that is supplied to the light driver 30. The voltage ripples may affect the DC output voltage/current of the converter 50, and the peak-to-peak voltage of the ripples may vary significantly depending on load. For example, the drive signal may exhibit a smaller peak-to-peak ripple at high voltage loads (e.g., when at high brightness settings or driving a high-voltage LED) and a relatively larger peak-to-peak ripple at low voltage loads (e.g., when at low driver settings or driving a low-voltage LED). In some examples, when the voltage of the drive signal is about 47 V, the peak-to-peak ripple may be about 6 V. In the related art, particularly in single-stage topologies, this ripple may not only affect the operation of the feedback loop thus resulting in undesirable output characteristics (e.g., shifts in output current/voltage), but may also lead to instances of shimmer and flicker that are visible in the light output of the light source 22. Such issues may become particularly prominent and noticeable at low dimming levels, where the light output of the light source 22 is reduced.

Accordingly, in some embodiments, the light driver 30 utilizes a regulator to further regulate the drive signal produced by the converter 50 to bring it to the desired load voltage and to reduce its ripple to a desired degree. The regulator 100 is coupled between the converter 50 and the output load 20. Here, the secondary controller (e.g., a secondary microprocessor) 108 controls the regulator 100 to ensure that the resultant regulated signal aligns with the specific profile (e.g., specific of the output load 20. In some embodiments, the regulator 100 performs a DC-to-DC conversion to step down the output voltage of the converter 50 into a lower value without dissipating excess power as wasted heat. The resulting regulated signal at the output of the regulator 100 also has a lower (e.g., substantially lower) ripple than the drive signal, so as to eliminate or substantially reduce visible flicker and shimmer at the light source 22. For example, the regulated voltage or current at the output of the regulator 100 may have a lower ripple than the drive voltage and/or current at the input of the regulator 100. Thus, the light driver 30 ensures that the generated regulated signal is precisely tailored to meet the demands of the connected output load 20, thereby contributing to a power-efficient and high-performance lighting system.

In some examples, the regulator 100 may include a step-down converter, a linear voltage regulator, a switching voltage regulators, a current limiting regulator, a low drop-out (LDO) regulator, and/or the like.

According to some embodiments, the secondary controller 108 is configured to monitor one or more voltages of the regulator 100 and to control the operations of the regulator 100 and the converter 50. In some embodiments, the secondary controller 108 detects the input voltage and the output voltage of the regulator 100. The secondary controller 108 then generates a feedback signal (e.g., the first feedback signal) to dynamically control the DC-level of the drive signal of the converter 50 based on the one or more voltages of the regulator 100. The secondary controller 108 further produces a separate feedback signal (e.g., the second feedback signal) to regulate the DC-level of the regulated signal to the output load 20. This interplay allows the secondary controller 108 to dynamically respond to varying conditions, ensuring the precise adjustment of both the drive signal and the regulated signal. Moreover, it enhances the adaptability of performance across a multitude of lighting scenarios, thereby aligning with the dynamic load profile of the connected output load 20.

According to some embodiments, the secondary controller 108 includes a processor (e.g., a programmable microprocessor) 110 for performing the data processing operations of the secondary controller 108, a memory (e.g., a storage memory) 112 for storing various data used by the secondary controller 108, a plurality of analog-to-digital (A/D) converters 114 at its input terminals, and a plurality of digital-to-analog (D/A) converters 116 at its output terminals. Two of the input terminals of the secondary controller 108 are electrically coupled the output of the converter 50 (i.e., input of the regulator 100) and the output of the regulator 110 (i.e., the input of the output load 20), and sample (e.g., measure) the output voltage $V_{COUT}$ of the converter 50 and the output voltage $V_{ROUT}$ of the regulator 100, respectively. Another input terminal of the secondary controller 108 monitors the output current $I_{OUT}$ of the regulator 100 (i.e., the load current) via the current sensor 102. The plurality of A/D converters 114 convert the readings to digital binary form for further processing by the processor 110.

In some embodiments, the secondary controller 108 utilizes the voltage and current readings to generate a first feedback signal for controlling the converter 50 and a second feedback signal for controlling the regulator 100. The D/A converters 116 converts the first and second feedback signals, which may be in digital binary format, to an analog signal to be supplied to the primary side 52 of the light driver 30 and to the regulator 100, respectively.

According to some embodiments, the secondary controller 108 calculates the voltage drop across the regulator 100 (i.e., $V_{COUT}-V_{ROUT}$) based on the measurements captured by the A/D converters 116 and uses it to generate the first feedback signal to control the DC value that drive signal (e.g., output current or voltage) of the converter 50 is to be regulated to.

According to some embodiments, the primary controller 60 may be coupled to the primary side 52 of the converter 50, and the secondary controller 108 and the regulator 100 may be coupled to the secondary side 54 of the converter 50 (and thus electrically isolated from the primary side 52 of the converter 50). Therefore, to maintain electrical isolation, the secondary controller 108 may communicate the first feedback signal to the primary controller 60 via the optocoupler 70. The primary controller 60 may, in turn, be configured to regulate the DC-level current or DC-level voltage of the drive signal based on the first feedback signal (e.g., by controlling the on/off time of the main switch 56 of the converter 50). Thus, the first feedback signal may control the input voltage of the regulator 100.

In some embodiments, the secondary controller 108 controls the DC-level of the drive signal to achieve a particular voltage drop (e.g., target voltage drop) across the regulator 100 (e.g., a drop of about 12 V to about 14 V, when the load voltage is about 28 V to about 32 V). This ensures that the regulator can operate efficiently to eliminate or substantially reduce the ripple at the regulated signal. As such, the first feedback signal may correspond to an difference between the target voltage drop and the actual measured voltage drop across the regulator 100.

In some embodiments, the light source 22 is a dimmable light (e.g., a dimmable LED). In such embodiments, the secondary controller 108 may determine the dimmer setting (e.g., a brightness setting ranging from 0-100%) based on an input from a dimmer controller 80, which may be communicatively couped to a 0-10V dimmer, a wireless dimmer, etc., or from any one of various suitable dimming control mechanism (e.g., a TRIAC dimmer at the input 10). Here, the secondary controller 108 may determine the target voltage drop across the regulator 100 based on the dimmer setting, and generate the first feedback signal accordingly.

According to some embodiments, the current sensor 102 is coupled between the regulator 100 and the output load 20, and is configured to measure the output current $I_{OUT}$ of the regulator 100 (i.e., the load current). The secondary controller 108 may generate the second feedback signal at least partly based on the output current $I_{OUT}$ and/or the output voltage $V_{ROUT}$, depending on the mode of operation.

In some embodiments, when the light driver 30 is operating in constant voltage mode to supply a desired constant voltage to the load, the secondary controller 108 adjusts the output voltage of the regulator 100, via the second feedback signal, to produce the desired voltage at its output. Further, when the light driver 30 is operating in constant current mode to supply a desired constant current to the load, the secondary controller 108 adjusts the output voltage of the regulator 100, via the second feedback signal, until the measured output current $I_{OUT}$ reaches the desired value. In either mode, when a dimmer is present, the secondary controller 108 may adjust the output voltage/current of the regulator 100 further based on the dimmer setting. For example, when a dimmer is set to 50% and the light driver operates in constant current mode, the secondary controller 108 controls the output current $I_{OUT}$ of the regulator 100 to be reduced by about half. The relationship between the second feedback signal and the dimmer setting may be determined based on a formula or a look-up table (LUT) stored in the memory 112 that maps dimmer settings to corresponding feedback signals.

By integrating the output current $I_{OUT}$ and/or output voltage $V_{OUT}$ of the regulator 100 into its feedback mechanism, the secondary controller 108 may refine the dynamic control of the DC-level of the drive and regulated signals, thereby ensuring a real-time response to the operating conditions of the regulator 100, and thus the lighting system 1.

In some embodiments, the current sensor 102 includes a sense resistor 104, which may be electrically coupled in series between the output terminal of the regulator 100 and the output load 20. The current sensor 102 may include a sense resistor 104 in the path of the output current $I_{OUT}$, and a current sense circuit 106 for measuring the voltage drop across the sense resistor 106 and generating a signal corresponding to the measured output current $I_{OUT}$. In some examples, the sense resistor 104 may be about 50 mΩ to about 1Ω. The generated signal may then be transmitted to the secondary controller 108 (e.g., to a A/D converter 114 of the secondary controller 108). In some examples, the generated signal may be too small to be accurately detected by the A/D converter 114, and so the light driver 30 may utilize an amplifier 120 to amplify the generated signal to a desired level that allows for precise and accurate detection of the measured current. Thus, the current sensor 102 allows the secondary controller 108 to make the proper dynamic adjustments based on real-time current conditions at the load 20.

While FIG. 1 illustrates embodiments in which a sense resistor 104 is utilized to measure the output current $I_{OUT}$, embodiments of the present disclosure are not limited thereto, and any suitable current sensor (such as a hall effect sensor) may be used.

Figure 2:
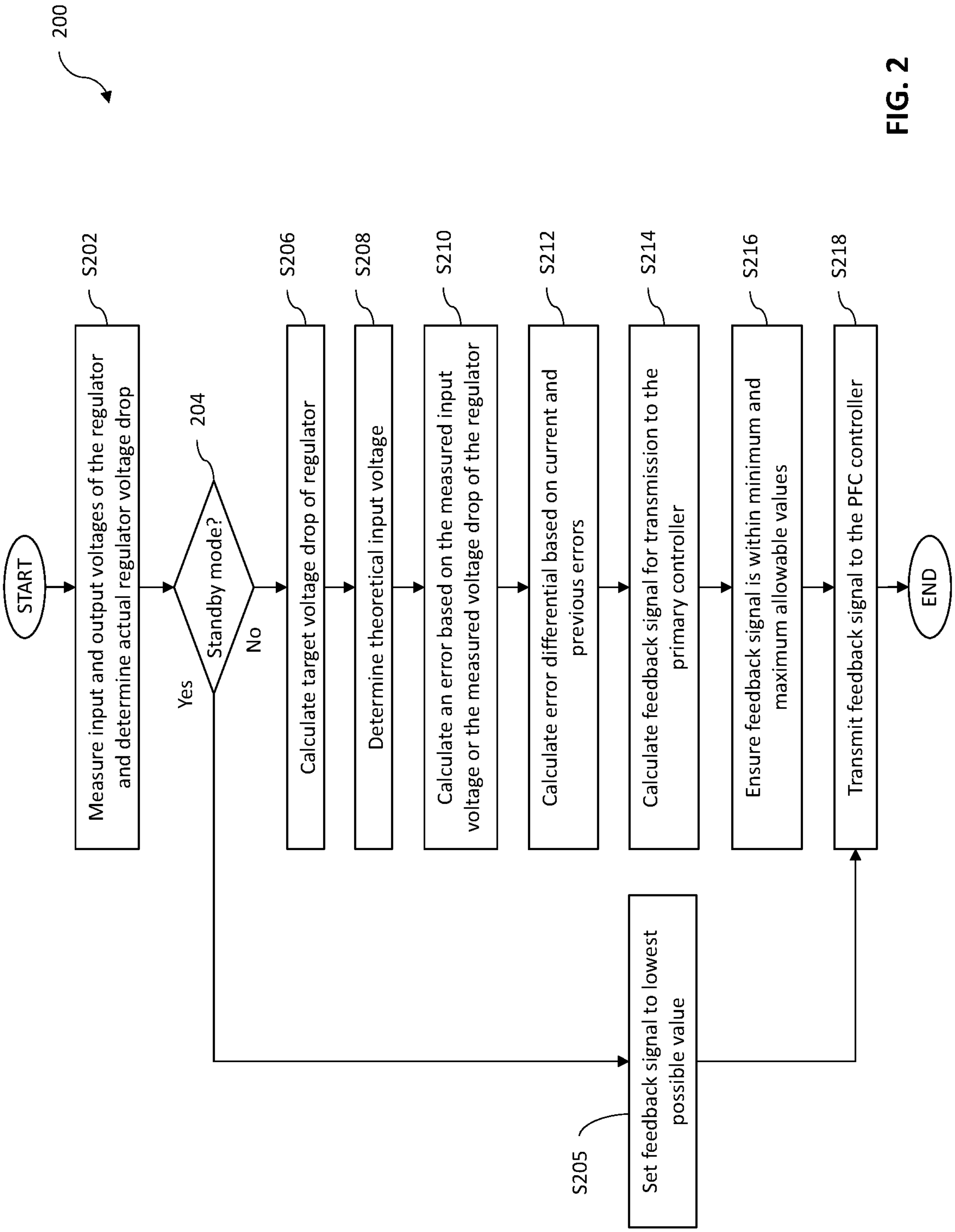
FIG. 2 illustrates a process for controlling the light driver by the secondary controller 108, according to some embodiments of the present disclosure.

FIG. 2 illustrates a process 200 for controlling the light driver (e.g., the primary side of the two-stage light driver) 30 by the secondary controller 108, according to some embodiments of the present disclosure.

According to some embodiments, the secondary controller 108 generates the first feedback signal to control the drive signal produced by the converter 50 based on the voltage measurements made at the regulator 100. It does so by calculating (e.g., continuously calculating) an error value as the difference between a desired/target regulator voltage drop and a measured regulator voltage drop, and applying a correction (via the first feedback signal) based on the calculated error. In some examples, the correction may be made via a proportional-integral-derivative (PID) control loop (or a proportional-derivative (PD) control loop).

In some embodiments, the secondary controller 108 measures the input voltage of the regulator 100 (i.e., the output voltage of the converter 50, $V_{COUT}$) and the output voltage of the regulator 100 (i.e., $V_{ROUT}$), and determines the actual voltage drop across the regulator 100 by subtracting the output voltage from the input voltage (i.e., $V_{COUT}-V_{ROUT}$; S202).

Before updating the feedback signal, the secondary controller 108 first checks whether the driver is in standby mode (S204). A standby mode is one in which the light driver is set to turn off the light source 22 (e.g., as a result of a user toggling a light switch to turn off the lights), but AC power is still present at the input 10. When in standby mode, the secondary controller 108 sets the output of the converter 50 to its lowest voltage level to reduce (e.g., minimize) power consumption of the light driver 30. The lowest voltage of the converter output may be non-zero, and may be at a level sufficient for providing minimum power at the bias windings coupled to the transformer 55 to power to the various active components (e.g., ICs, processors, etc.) within the light driver 30. However, this minimum voltage may be too low for the regulator 108 to operate, thus turning off the light source, or even if the regulator could operate off of such low input voltage, the voltage at its output may still be lower than the minimum forward voltage of the LEDs, thereby turning off the light source 22.

Thus, when the secondary controller 108 determines that the light driver 30 is in standby mode, it sets the first feedback signal to a lowest value (S205) and transmits the first feedback signal to the primary controller 60 (S218), which in turn controls the converter 50 to produce its lowest output voltage.

When not in standby, the secondary controller 108 proceeds to calculate the first feedback signal based on the voltage measurements at the input and output of the regulator 100.

In some embodiments, the secondary controller 108 determines a target voltage drop of the regulator 100 (S206). The target voltage drop is one that allows the regulator 100 to operate efficiently (e.g., at greater than 90% efficiency) while producing low (e.g., minimum or nearly zero) output ripple at maximum output current. The target voltage drop may depend on the regulator used and the configuration of the light source 22 at the output. For example, the target voltage drop may be about 12 V. However, in some examples, the regulator may operate at a headroom as low as 2 V. The secondary controller 108 controls the output voltage of the converter 50, via the first feedback signal, such that the voltage drop across the regulator 100 is at the desired target level.

According to some embodiments, the secondary controller 108 determines the target voltage drop based on a dimmer setting (e.g., a light diming level), which may be set via a phase-cut dimmer, a 0-10V dimmer, a wireless dimmer, etc. In some embodiments, the secondary controller 108 calculates the target voltage drop as:

$$\text{target voltage drop} = \text{min target drop} + m \times (1 - dimValue) \qquad \text{EQ (1)}$$

where min target drop is a constant value representing the minimum desired voltage drop across the regulator 100, m is dimming multiplier, and dimValue represents the dimmer setting. The parameters min target drop and m may depend on the regulator used and the light source of the output load, and may be experimentally determined. Here, a dim Value of 1 may correspond to a 100% dimmer setting, a dimValue of 0 corresponds to a 0% dimmer setting.

In some examples, this may be calculated as:

$$\text{target voltage drop} = 12V + 2 \times (1 - dimValue) \qquad \text{EQ (2)}$$

Therefore, in such examples, when the dimmer is set at 100%, the target voltage drop is 12 V, and when the dimmer is at 0%, the target voltage drop is 14 V. The higher target voltage drop helps to eliminate or substantially reduce shimmer and flicker at low dimming levels, as these issues become more prominent/visible at low dim levels.

In some embodiments, the secondary controller 108 calculates a theoretical input voltage of the regulator 100, which is the voltage at the output of the converter 50 assuming the light driver 30 achieves the target voltage drop, based on the target voltage drop and the output voltage of the regulator $V_{ROUT}$ (S208). The theoretical input voltage may be calculated by adding the measured voltage at the output of the regulator 100 to the target voltage drop.

Then the secondary controller 108 proceeds to determine an error (e.g., a current error), which is used in generating the first feedback signal (S210). When the theoretical input voltage is within a first range (e.g., within acceptable bounds for the output voltage of the converter 50), the current error may represent the error/difference between the target voltage drop and the actual voltage drop across the regulator 100.

In some embodiments, the secondary controller 108 also calculates an error difference as a difference between the current error and the previously calculated error (i.e., last or most recently calculated error; S212), as expressed by:

$$\text{error difference} = \text{previous error} - \text{current error} \qquad \text{EQ (3)}$$

This error differential indicates how far the voltage drop across the regulator 108 has changed since the previous feedback signal, that is, the last first feedback signal that was sent to the primary controller 80.

The secondary controller 108 then calculates the (updated) first feedback signal for transmission to the primary controller 80 based on the current error (S214). In some embodiments, the secondary controller 108 calculates the first feedback signal further based on at least one of the error difference and the previous feedback signal. The (updated/current) first feedback signal may be expressed as:

$$\text{first feedback signal} = \text{previous first feedback signal} - K_P \times \text{error} + K_D \times \text{error difference} \qquad \text{EQ (4)}$$

Where $K_P$ represents the gain applied to the magnitude of the current error that is to be corrected, and $K_D$ represents the gain applied to the error difference. The gains $K_P$ and $K_D$ may be experimentally determined to reduce ringing at the output of the converter 50, which may result from over/under correction by the feedback loop. In some examples, $K_P$ may be 20, and $K_D$ may be 10; however, this is merely an example, and the two gains may have any suitable values.

While some embodiments of the present disclosure described above use the magnitude of error in the regulator voltage drop and the error differential, embodiments of the present disclosure are not limited thereto. For example, the secondary controller 108 may further calculate an integration value to account for how long the regulator voltage drop has been off from the target value. That is, in some embodiments, Equation 4 may further include an integration term. Further, in some examples, Equation 4 may omit the differential term (i.e., $K_D \times$error difference), and the secondary controller 108 may calculate the first feedback signal based on the current error and the previous feedback signal. However, these are merely examples, and any suitable control loop may be used to bring the voltage drop across the regulator 100 to the desired value during operation.

In some embodiments, before the updated first feedback signal is transmitted to the primary controller 80, the secondary controller 108 ensures that the updated feedback signal is within acceptable bounds, that is, a second range (S216). When the feedback signal is not within the second range, the secondary controller 108 sets the feedback signal to a maximum value of the second range, in response to the feedback signal exceeding the maximum value, and sets the first feedback signal to a minimum value, in response to the first feedback signal being below the minimum value of the second range.

The secondary controller 108 then transmits the first feedback signal to the primary controller 80 of the light driver 30 (e.g., via the optocoupler 70; S218). In transmitting the first feedback signal, the secondary controller 80 may transmit a DC signal or a pulse-width-modulation (PWM) signal having a DC level corresponding to the first feedback.

According to some embodiments, the secondary controller 108 generates the second feedback signal based on at least one of the output voltage and the output current of the regulator 100, and transmits it to the regulator 100 for regulating the output voltage or the output current of the regulator 100, as part of a second control loop. In some embodiments, the second feedback signal is further based on the dimmer setting, as described above.

Figure 3:
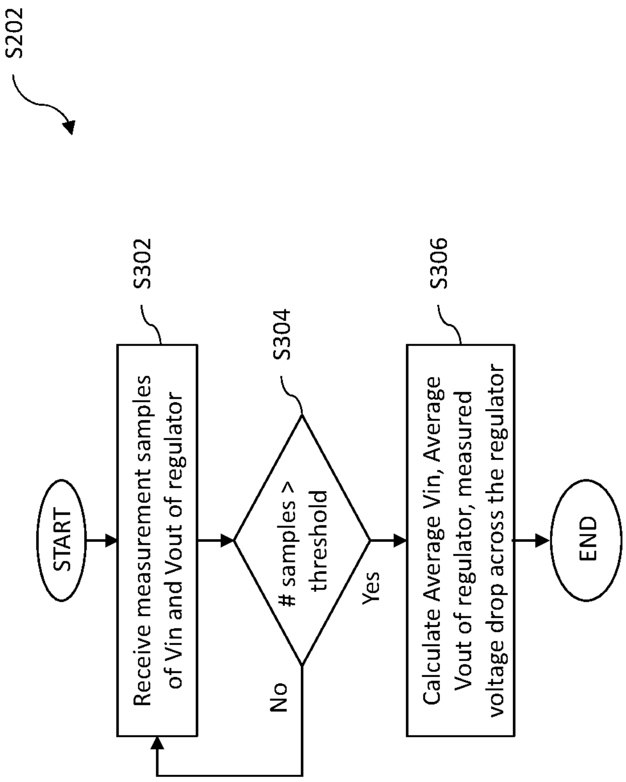
FIG. 3 is a flow diagram illustrating the process of measuring voltages of the regulator, according to some embodiments of the present disclosure.

FIG. 3 is a flow diagram illustrating the process S202 of measuring voltages of the regulator 100, according to some embodiments of the present disclosure.

In some embodiments, to reduce (e.g., to minimize) the effect of noise and line ripple in measuring the regulator voltage drop, the secondary controller 108 uses an averaged signal that represents the difference between the input voltage and the output voltage of the regulator 108. In some examples, the secondary controller 108 continuously samples the input and output voltages of the regulator 108 until a threshold count (e.g., 30, 31, 32, or 33 times) is reached (S302 and S304) and then averages them to calculate the input and output voltages and the actual voltage drop across the regulator 100 (S306).

The number of samples that are averaged determines the rate at which the first and second feedback signals may be updated. The lower the number of samples that are averaged, the faster the secondary controller 108 can respond to changes in the output voltage of the converter 50 and the regulator 100. However, as the system has a certain response time (i.e., time is takes for the output of the converter 50 to adjust in response to a change in the first feedback signal), increasing the rate at which the first feedback signal is updated beyond a certain point may also cause oscillations in the output, which is undesirable. Further, reducing the number of averaged samples may also increase noise and ripple. For example, the input AC voltage may introduce 120 Hz and 60 Hz harmonics into the system. In some examples, 120 Hz may correspond to about 8 samples. Therefore, it is desirable to sample across at least two harmonics to ensure that the effect of the harmonics can be canceled out. Thus, in some examples, 30 or so samples may be averaged before updating the first feedback signal; however, embodiments of the present disclosure are not limited thereto. Increasing the number of averaged samples may also make it easier to identify the correct values (e.g., optimum values) for the gain parameters $K_P$ and $K_D$ may in Equation 4.

Figure 4:
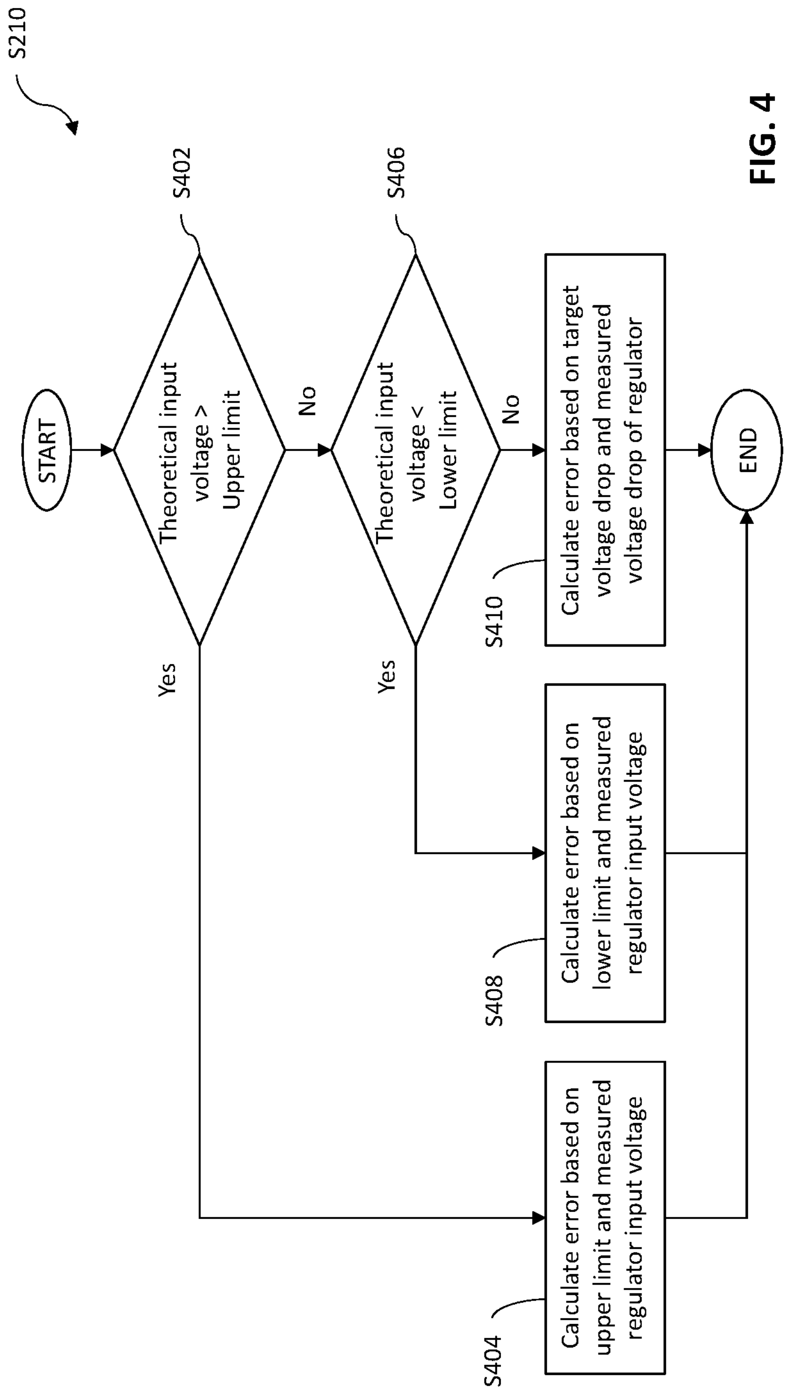
FIG. 4 is a flow diagram illustrating the process of calculating the current error in the voltage drop of the regulator, according to some embodiments of the present disclosure.

FIG. 4 is a flow diagram illustrating the process S210 of calculating the current error in the voltage drop of the regulator 100, according to some embodiments of the present disclosure.

In some embodiments, to ensure that the first feedback signal does not result in a converter output voltage that exceeds operational parameters, the secondary controller 108 determines whether the theoretical input voltage is within the first range (e.g., within acceptable bounds for the output voltage of the converter 50). In some examples, the regulator 100 may be driving a load of about 28 V to 38 V, and the converter 50 may be rated to a maximum voltage of about 50 V. In such cases, the first range may be from a minimum input voltage of about 40 V (to have at least two volts of headroom to allow the regulator 100 to function) to a maximum input voltage of about 47 V (to allow for 3 V of ripple on the 47 V at the output of the converter 40); however, this is merely an example, and embodiments of the present disclosure are not limited thereto.

When the secondary controller 108 determines that the theoretical input voltage is within the first range, it calculates the current error based on the target voltage drop and the actual/measured voltage drop across the regulator 100 (S410). In some embodiments, the secondary controller 108 calculates the current error as:

$$\text{current error} = \text{target voltage drop} - \text{actual voltage drop} \qquad \text{EQ (5)}$$

where the actual voltage drop is the measured voltage drop across the regulator 100 (i.e., $V_{COUT}-V_{ROUT}$). Here, the current error indicates how far the voltage drop is from the target/desired value.

When the secondary controller 108 determines that the theoretical input voltage is not within the first range, it calculates the current error based on the upper limit or the lower limit of the input of the regulator 100 (or, equivalently, the output of the converter 50) and the measured input voltage of the regulator ($V_{COUT}$). For example, in response to determining that the theoretical input voltage of the regulator 100 is greater than the upper limit of the first range (S402), the secondary controller 108 calculates the current error based on the upper limit and the regulator input voltage (S404); and in response to determining that the theoretical input voltage of the regulator is less than the lower limit of the first range (S406), the secondary controller 108 calculates the current error based on the lower limit and the regulator input voltage (S408).

In some embodiment, when the theoretical input voltage (e.g., desired target converter voltage) is greater than the upper limit (e.g., upper bound of acceptable limits; e.g., 47 V), the secondary controller 108 sets the error to be corrected (i.e., current error) such that the output voltage of the converter 50 does not exceed the upper limit by setting the error as:

$$\text{current error} = \text{upper limit voltage} - \text{regulator input voltage} \qquad \text{EQ (6)}$$

where the regulator input voltage is the measured $V_{COUT}$.

In some embodiment, when the theoretical input voltage is less than the lower limit (e.g., lower bound of acceptable limits; e.g., 40 V), the secondary controller 108 sets the error to be corrected (i.e., current error) such that the output voltage of the converter 50 does not fall below the lower limit by setting the error as:

$$\text{current error} = \text{lower limit voltage} - \text{regulator input voltage} \qquad \text{EQ (7)}$$

Here, the current error calculated is less than it would otherwise be if the theoretical input voltage was within acceptable bounds, and this is done to ensure that the calculated current error is only enough for the converter output voltage to reach one of the upper/lower limits and not to exceed the limit.

Accordingly, as described above, the lighting system including the two-stage light driver of the present disclosure provides improved dimming control and performance by monitoring voltage levels at both sides of the regulator and providing individualized feedback control to the two stages of the light driver. This allows the light driver to eliminate or substantially reduce instances of flicker and shimmer at the output. Further, this improved feedback may not involve additional circuitry or components, and therefore may not increase the overall cost of the system. Additionally, due to the adjustments being implemented through software, there is increased flexibility in tuning of the desired voltage levels and dynamic behavior of the light driver.

The term "processing circuit" or "processor" is used herein to include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

It will be understood that, although the terms “first”, “second”, “third”, etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms “a” and “an” are intended to include the plural forms as well, unless the context clearly indicates otherwise. It will be further understood that the terms “include,” “including,” “comprises,” “comprising,” “has,” “have,” and “having,” when used in this specification, specify the presence of stated features, integers, steps, operations, elements, and/or components, but do not preclude the presence or addition of one or more other features, integers, steps, operations, elements, components, and/or groups thereof.

As used herein, the term “and/or” includes any and all combinations of one or more of the associated listed items. For example, the expression “A and/or B” denotes A, B, or A and B. Expressions such as “one or more of” and “at least one of,” when preceding a list of elements, modify the entire list of elements and do not modify the individual elements of the list. For example, the expression “one or more of A, B, and C,” “at least one of A, B, or C,” “at least one of A, B, and C,” and “at least one selected from the group consisting of A, B, and C” indicates only A, only B, only C, both A and B, both A and C, both B and C, or all of A, B, and C.

Further, the use of “may” when describing embodiments of the inventive concept refers to “one or more embodiments of the inventive concept.” Also, the term “exemplary” is intended to refer to an example or illustration.

It will be understood that when an element or layer is referred to as being “on”, “connected to”, “coupled to”, or “adjacent” another element or layer, it can be directly on, connected to, coupled to, or adjacent the other element or layer, or one or more intervening elements or layers may be present. When an element or layer is referred to as being “directly on,” “directly connected to”, “directly coupled to”, “in contact with”, “in direct contact with”, or “immediately adjacent” another element or layer, there are no intervening elements or layers present.

As used herein, the term “substantially,” “about,” and similar terms are used as terms of approximation and not as terms of degree, and are intended to account for the inherent variations in measured or calculated values that would be recognized by those of ordinary skill in the art.

As used herein, the terms “use”, “using”, and “used” may be considered synonymous with the terms “utilize”, “utilizing”, and “utilized”, respectively.

When one or more embodiments may be implemented differently, a specific process order may be performed differently from the described order. For example, (i) the disclosed operations of a process are merely examples, and may involve various additional operations not explicitly covered, and (ii) the temporal order of the operations may be varied.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The light driver and/or any other relevant devices or components according to embodiments of the present disclosure described herein, such as the primary controller and the secondary controller, may be implemented by utilizing any suitable hardware, firmware (e.g., an application-specific integrated circuit), software, or a suitable combination of software, firmware, and hardware. For example, the various components of the processor may be formed on one integrated circuit (IC) chip or on separate IC chips. Further, the various components of the light driver may be implemented on a flexible printed circuit film, a tape carrier package (TCP), a printed circuit board (PCB), or formed on the same substrate. Furthermore, the various components of the light driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While the present disclosure has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of the present disclosure, as set forth in the following claims and equivalents thereof.

What is claimed is:

1. A light driver comprising:

a converter configured to generate a drive signal for driving an output load based on a rectified input signal;

a regulator coupled between the converter and the output load, and configured to generate a regulated signal based on the drive signal;

a secondary controller configured to detect a voltage of the regulator, to generate a first feedback signal to dynamically control a DC-level of the drive signal based on the voltage of the regulator, and to generate a second feedback signal for controlling a DC-level of the regulated signal; and a primary controller coupled to a primary side of the converter and configured to regulate a DC-level current or a DC-level voltage of the drive signal based on the first feedback signal from the secondary controller.

2. The light driver of claim 1, wherein the regulated signal has a lower ripple than the drive signal.

3. The light driver of claim 1, wherein the voltage of the regulator is a voltage drop across the regulator.

4. The light driver of claim 1, further comprising a current sensor coupled to the secondary controller and configured to measure an output current of the regulator, wherein the secondary controller is configured to generate the second feedback signal further based on the output current.

5. The light driver of claim 4, wherein the current sensor comprises:

a sense resistor electrically coupled between an output terminal of the regulator and the output load; and a current sense circuit coupled to the sense resistor and configured to measure an output current of the regulator via the sense resistor, to generate a sense signal corresponding to the measured output current, and to transmit the sense signal to the secondary controller.

6. The light driver of claim 1, wherein the secondary controller is configured to generate the second feedback signal based on a dimmer setting.

7. The light driver of claim 6, wherein the secondary controller is coupled to a dimmer and is configured to determine the dimmer setting based on a signal associated with the dimmer.

8. The light driver of claim 1, wherein the regulator is configured to generate the regulated signal further based on the second feedback signal.

9. The light driver of claim 1, wherein the drive signal is an output current or an output voltage of the converter, wherein the converter is a DC-DC converter, and wherein the regulator is a step-down converter.

10. The light driver of claim 1, wherein the converter has a primary side and a secondary side electrically isolated from, and inductively coupled to, the primary side, and wherein the secondary controller and the regulator are electrically isolated from the primary side of the converter.

11. The light driver of claim 1, wherein the secondary controller is configured to provide the first feedback signal to the primary controller via an optocoupler.

12. The light driver of claim 1, wherein the output load includes one or more light emitting diodes (LEDs).

13. The light driver of claim 1, further comprising a rectifier configured to generate the rectified input signal based on an input AC signal.

14. A lighting system comprising:

a rectifier configured to generate a rectified input signal based on an input AC signal;

a converter configured to a drive signal for driving an output load based on the rectified input signal, the output load including one or more light emitting diodes (LEDs);

a regulator coupled between the converter and the output load, and configured to generate a regulated signal based on the drive signal;

a secondary controller configured to detect a voltage of the regulator, to generate a first feedback signal to dynamically control a DC-level of the drive signal based on the voltage of the regulator, and to generate a second feedback signal for controlling a DC-level of the regulated signal; and a primary controller coupled to a primary side of the converter and configured to regulate a DC-level current or a DC-level voltage of the drive signal based on the first feedback signal from the secondary controller.

15. The lighting system of claim 14, wherein the regulated signal has a lower ripple than the drive signal, and wherein the voltage of the regulator is a voltage drop across the regulator.

16. The lighting system of claim 14, further comprising a current sensor coupled to the secondary controller and configured to measure an output current of the regulator, wherein the secondary controller is configured to generate the second feedback signal further based on the output current.

17. The lighting system of claim 14, wherein the secondary controller is configured to generate the second feedback signal based on a dimmer setting, and wherein the regulator is configured to generate the regulated signal further based on the second feedback signal.

18. The lighting system of claim 17, wherein the secondary controller is coupled to a dimmer and is configured to determine the dimmer setting based on a signal associated with the dimmer.

19. The lighting system of claim 14, wherein the drive signal is an output current or an output voltage of the converter, wherein the converter is a DC-DC converter, wherein the regulator is a step-down converter, wherein the converter has a primary side and a secondary side electrically isolated from, and inductively coupled to, the primary side, and wherein the secondary controller and the regulator are electrically isolated from the primary side of the converter.

20. The lighting system of claim 14, wherein the secondary controller is configured to provide the first feedback signal to the primary controller via an optocoupler.

* * * * *